United States Patent Office 3,606,873
Patented Sept. 21, 1971

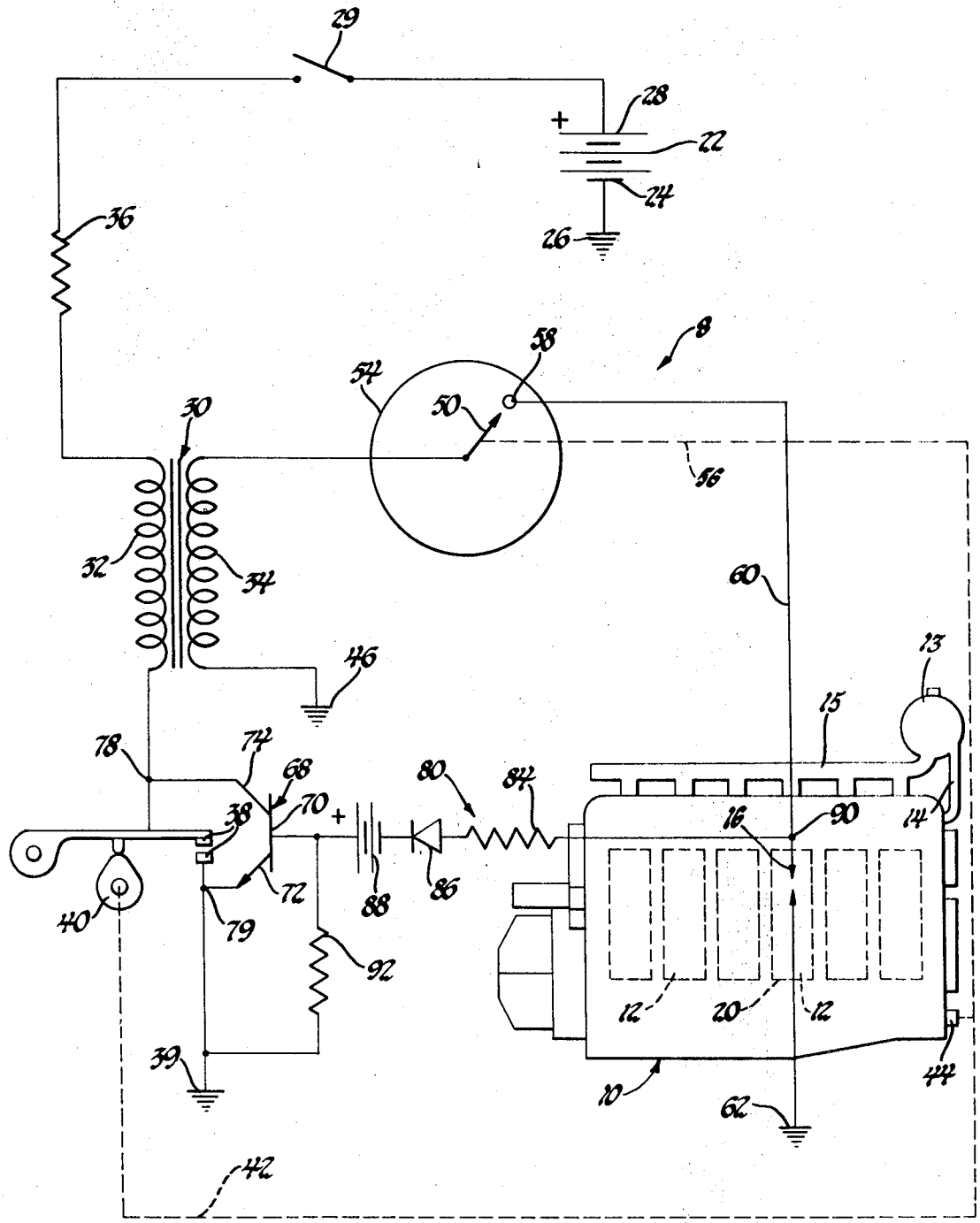

3,606,873
IGNITING SYSTEM FOR DIESEL
ENGINE STARTING
Gustav F. Rademacher and Donald R. Van Uum,
Davison, Mich., assignors to General Motors Corporation, Detroit, Mich.
Filed May 1, 1970, Ser. No. 33,638
Int. Cl. F02b 3/00; F02n 17/00; F02p 1/00
U.S. Cl. 123—179B6
2 Claims

ABSTRACT OF THE DISCLOSURE

An igniting system is provided in a diesel engine wherein a spark ignition circuit including a spark plug mounted in one of the engine combustion chambers assists starting by spark ignition. After normal compression ignition is established, the ignition circuit is deactivated by a semiconductor switch. The semiconductor switch is controlled in response to ionization of combustion chamber gases which normally occurs as the engine is running.

---

This invention relates to diesel engines and more particularly to an igniting system for starting a diesel engine by spark ignition.

It is well known that the operation of a diesel engine includes combustion initiated by compression ignition rather than by spark ignition as in gasoline engines, for example. One problem encountered with diesel engines is in starting when the pressure and temperature in the combustion chambers are not sufficient to ignite the compressed fuel-air mixture. To heat the combustion chamber gases, starting devices including glow plugs mounted in the combustion chambers or heating coils mounted in the air intake manifolds have been employed. These devices often have a short service life and require attention by an operator so they are controlled in accordance with ambient temperatures.

Also for certain applications it has become increasingly common for diesel engines to include supercharging apparatus which under certain load and temperature conditions has increased the difficulty of starting. The supercharging apparatus does not become fully operative for delivering air and increasing the combustion chamber pressures until after the engine has reached a running condition. Also, during low load and low temperature running conditions, supercharged diesel engines may fail to ignite during the compression cycle because of lower compression pressures developed in the combustion chambers. Accordingly, assistance in establishing ignition may be required during running as well as starting conditions.

In accordance with the present invention, an igniting system is provided for starting a diesel engine in which an ignition circuit connected to a spark plug mounted in one of the combustion chambers develops sparking discharges to start the engine. When the engine becomes self-igniting by compression ignition, the igniting system is automatically rendered inoperative by a semiconductor switch that is rendered conductive. The input to the semiconductor switch is connected across the electrode gap of the spark plug so that ionization in the combustion chamber, which accompanies combustion, provides a conductive circuit path across the spark plug gap for rendering the semiconductor switch conductive. Accordingly, the ignition circuit is rendered inoperative while the normal compression ignition is occurring in the engine.

It is an object of this invention to provide an igniting system for a compression ignition type of internal combustion engine which is controlled in response to the presence or absence of combustion in the combustion chambers of the engine.

A still further object of this invention is to provide an igniting system for a diesel engine including a spark ignition circuit which develops ignition pulses for starting the engine by igniting the fuel-air mixture with spark discharges and in which a semiconductor switch is connected to the ignition circuit to turn off the ignition pulses in response to ionization due to combustion occurring in the combustion chambers of the engine.

A still further object of this invention is to provide an igniting system for starting a diesel engine in which a spark ignition circuit supplies ignition pulses to a spark plug arranged in one of the combustion chambers of the engine, and further in which the collector-emitter output circuit of a transistor switching device is connected across breaker contacts provided in the spark ignition circuit and the base-emitter biasing input circuit is connected to the spark plug gap so that the transistor device is biased conductive in response to the ionization occurring in the combustion chambers thereby deactivating the ignition circuit when combustion developed by compression ignition occurs.

Further objects and advantages of the present invention will be apparent from the following description reference being had to the accompanying drawing wherein a preferred embodiment of the present invention is clearly shown.

In the drawings:

A single figure drawing is a schematic circuit diagram illustrating an igniting system for a diesel engine made in accordance with this invention.

Referring now to the drawing, the reference numeral 8 designates an igniting system for a diesel internal combustion engine 10 having a plurality of combustion chambers, which are generally designated by the numeral 12, wherein six are shown for purposes of illustration. The diesel engine 10 may be of the type also including a supercharging apparatus 13 which is of the turbo supercharger type, for example, used to supply additional air for increasing the compression pressures of the combustion chambers 12. The supercharger 13 is mounted between an exhaust manifold conduit 14 and air intake manifold conduit 15 and operates in a manner well known to those skilled in the art of internal combustion engines.

A spark discharge device is provided by a spark plug 16 mounted in one of the combustion chambers 12, for example the chamber designated 20. The spark plug 16 includes spaced electrodes disposed within the combustion chamber 20. Sparking discharges developed across the gap between the electrodes ignite the fuel-air mixture in the combustion chamber. These discharges occur during the compression cycle of operation of the chamber in accordance with this invention as described further hereinbelow.

A spark ignition circuit included within the igniting system 8 is connected to the spark plug 16 to develop high potential ignition pulses for producing the sparking discharges. A voltage source for the system is provided by a battery 22 having the negative pole 24 thereof connected to a ground reference point 26. The battery positive pole 28 is connected to an ignition switch 29.

An ignition coil 30 including a primary winding 32 and a secondary winding 34 has one end of the primary winding 32 connected to the ignition switch 29 through a ballast resistor 36. A pair of breaker contacts 38 providing a switching means having intermittent open and closed positions is connected between the other end of the primary winding 32 and a ground reference point 39 which provides a return path to the negative pole 24 of the battery 22. The breaker contacts 38 are opened and closed by a cam 40 which is operatively connected by a shaft means 42 to the drive shaft 44 of the engine 10.

The secondary winding 34 of the ignition coil 30 has one end connected to a ground reference point 46 and the other end connected to the rotor electrode 50 of a rotary switch of the distributor type which is designated 54. The rotor electrode 50 is driven by a shaft means 56 mechanically coupled to the drive shaft 44 so that it periodically registers with a stationary electrode 58. The rotor electrode 50 and stationary electrode 58 can be mounted in a common housing along with the breaker contacts 38 so that the two shaft means 42 and 56 can be provided by a single shaft in an integral distributor apparatus well known to those skilled in spark ignition circuits used in gasoline engines.

The stationary electrode 58 is connected to the spark plug 16 by an ignition cable 60. The electrodes of the spark plug 16 are connected between the ignition cable 60 and a ground reference point 62 whereby the distributor 54 periodically connects the secondary winding 34 to the spark plug 16. The intermittent opening and closing of the breaker contacts 38 periodically interrupts the current flow through the primary winding 32 to produce high potential ignition pulses in the secondary winding 34. The distributor delivers the ignition pulses to the spark plug 16 during the compression stroke of the piston disposed in the combustion chamber 20 and connected to the drive shaft 44. Accordingly, sparking discharges are produced across the gap of spark plug 16 to ignite the fuel-air mixture of the combustion chamber 20 by spark ignition.

The diesel engine 10 normally operates by self-igniting or compression ignition since the pressure and temperature within the combustion chambers is sufficient to ignite the fuel-air mixture when it is compressed in the combustion chambers 12 in a manner well known in diesel engines. In order to render the igniting system 8 inoperative when self ignition occurs, a semiconductor switch provided by a transistor 68 is included in the igniting system 8. The transistor 68 is an NPN switching type having base 70, emitter 72, and collector 74 electrodes. It is to be understood that other semiconductor switching devices such as thyristors and gate controlled semiconductor devices may be employed if it is desired to replace the transistor 68.

The collector-emitter circuit of the transistor 68 forms the transistor output which is connected across the breaker contacts 38. The collector 74 is connected to the junction 78 between the breaker contacts 38 and the primary winding 32. The emitter 72 is connected to the junction 79 between the breaker contacts and the reference point 39.

The input to the transistor 68 is provided at the base 70 which is connected to a base-emitter biasing circuit 80 including a current limiting resistor 84, a blocking diode 86 poled in a forward direction toward the base 70 and a source of biasing voltage 88 having the positive pole thereof connected toward the base 70. The biasing circuit 80 is further connected to a junction 90 between the ignition cable 60 and the spark plug 16. Thus, the biasing circuit 80 is connected in a series circuit including the base-emitter of the transistor 68, the electrodes of the spark plug 16, and the reference points 62 and 39. A further biasing resistor 92 is provided between the base 70 and the reference point 39.

The electrodes of the spark plug 16 provided in the combustion chamber 20 provide a further function, in addition to providing sparking discharges, by forming an ionization sensing gap. When combustion occurs in the combustion chamber 20 the elevated temperatures cause ionization of the gases of the fuel-air mixture. Therefore, when the fuel-air mixture is being ignited by compression ignition a closed circuit path is provided through the gap between the spark plug electrodes by the ionized particles in the combustion chamber 20. It is to be understood that a separate ionization sensing device or other equivalent electrical transducers may be disposed within the chamber 20 and connected with the biasing circuit 80 of the transistor 68 to sense combustion. However, the electrodes of the spark plug 16 provide a suitable and reliable means, as well as a convenient one, for detecting ionization within the combustion chamber when combustion occurs.

In operation, when it is desired to start the diesel engine 10 or reestablish combustion within the combustion chambers 12 the ignition switch 29 is closed and the transistor 68 is in the normally nonconductive state. The biasing circuit 80 is in an open circuited condition since there is no conductive path across the electrode gap of the spark plug 16. As an auxiliary cranking motor, not shown, drives the engine for starting, the breaker contacts 38 will open and close in synchronism with the drive shaft 44. The high potential ignition pulses developed in the secondary winding 34 are coupled through the distributor 54 and to the spark plug 16. Sparking discharges occurring across the electrodes of the spark plug 16 ignite the fuel-air mixture injected into the combustion chamber 20. While the ignition pulses are being delivered to the spark plug 16, the blocking diode 86 isolates the base-emitter circuit of the transistor 68 from the ignition pulses which have a negative polarity relative to the reference points 39 and 62.

The engine is heated by the combustion in the chamber 20 and the combustion chamber exhaust gases start the supercharger 13. Along with increased temperature the combustion chamber pressures are increased by the supercharger so that compression ignition begins in all of the combustion chambers 12 to start normal diesel engine operation.

With the temperatures and pressures within the combustion chambers 12 reaching sufficient levels so that the fuel-air mixture becomes ignited during each compression stroke of the engine pistons, ionization of the combustion chamber gases provide the closed conductive circuit across the electrodes of the spark plug 16. Accordingly, current supplied from the battery 88 in the biasing circuit 80 provides base drive current which forward biases the base-emitter circuit of the transistor 68 so that it is switched to the conductive state. The low impedance of the collector-emitter circuit effectively shunts the breaker contacts 38 and grounds the lower end of the primary winding 32. Thus, the opening and closing of the breaker contacts 38 does not produce an interruption in current flow through the primary winding 32 and the ignition circuit is deactivated since the generation of ignition pulses in the secondary winding 34 is discontinued.

The igniting system 8 does not provide ignition pulses while the diesel engine 10 is running normally by compression ignition initiating combustion in the combustion chambers 12. The timing of opening of the breaker contacts 38 occurs after combustion has begun in the combustion chamber 20 so that the gap of the spark plug 16 is in an ionized region and the transistor 68 is in the conductive state when the breaker contacts are opened.

If a change in the engine running or operating conditions causes the compression ignition to fail, the absence of ionization across the spark plug gap renders the transistors 68 nonconductive. In accordance with the operation described above, the ignition system 8 is always ready to reestablish combustion in the combustion chamber 20 by spark ignition when normal compression ignition fails and thereby restart the engine.

While the embodiment of the present invention as herein disclosed constitutes a preferred form it is to be understood that other forms might be adopted. For example, more than one of the combustion chambers 12 may be provided with a spark plug 16. The additional spark plugs would be connected to other stationary electrodes, not shown, which are provided in the distributor switch 54.

We claim:

1. An igniting system for diesel engine starting comprising: a spark discharge device including a pair of spaced electrodes disposed in a combustion chamber of said engine; a source of voltage; an ignition coil having a primary winding and a secondary winding; means connecting said secondary winding to said spark discharge device; a switch means connecting said primary winding in series with said voltage source and having periodic opened and closed positions thereby being operative to generate high potential ignition pulses in said secondary winding which are discharged across said pair of spaced electrodes; a semiconductor switch including an input circuit and an output circuit; means connecting the output circuit of said semiconductor switch means across said switch means whereby said output circuit provides a low impedance shunt path across said switch means when said semiconductor switch means is rendered conductive; and a biasing circuit means connecting the input circuit of said semiconductor switch to said pair of spaced electrodes of said spark discharge device, whereby compression ignition occurring in said combustion chamber forms an ionization region which provides a conductive path between said pair of spaced electrodes so that said biasing circuit means is operative to render said semiconductor switch means conductive and thereby deactivate said igniting system.

2. An igniting system for starting a diesel engine having a turbo supercharger, said system comprising: a spark discharge device including a pair of spaced electrodes disposed in a combustion chamber of said engine; a first voltage source; an ignition coil having a primary winding and a secondary winding; means connecting said secondary winding to said spark discharge device; a switch means connecting said primary winding in series with said first voltage source and having periodic opened and closed positions so as to generate high potential ignition pulses in said secondary winding which produce sparking discharges across said pair of spaced electrodes, said sparking discharges igniting the fuel-air mixture of said combustion chamber to heat said engine and operate said turbo supercharger from exhaust gases produced thereby; a transistor including emitter, collector and base electrodes and having conductive and nonconductive states; means connecting the collector-emitter circuit of said transistor across said switch means whereby said collector-emitter circuit provides a low impedance shunt path across said switch means when said transistor is in said conductive state to render said igniting system inoperative for producing sparking discharges; and a biasing circuit means including a second source of voltage connecting the base-emitter circuit of said transistor across said pair of spaced electrodes of said spark discharge device, whereby when normal compression ignition occurs in said combustion chamber ionization within the gap between said pair of spaced electrodes permits forward biasing current to be supplied through said biasing circuit means for rendering said transistor conductive.

References Cited
UNITED STATES PATENTS

| | | | |
|---|---|---|---|
| 2,403,440 | 7/1946 | Jansson | 123—325P |
| 2,960,973 | 11/1960 | Davis | 123—1 |
| 3,149,620 | 9/1964 | Cataldo | 123—248E |

MARK M. NEWMAN, Primary Examiner

R. B. COX, Assistant Examiner

U.S. Cl. X.R.

123—32SA, 148E